(12) United States Patent
Seeto

(10) Patent No.: US 11,954,376 B2
(45) Date of Patent: Apr. 9, 2024

(54) AUTOMATIC PRINT BLEED CORRECTION SYSTEMS AND METHODS

(71) Applicant: Canva Pty Ltd, Surry Hills (AU)

(72) Inventor: Michelle Munn Wai Seeto, Five Dock (AU)

(73) Assignee: Canva Pty Ltd, Surry Hills (AU)

( * ) Notice: Subject to any disclaimer, the term of this patent is extended or adjusted under 35 U.S.C. 154(b) by 0 days.

(21) Appl. No.: 18/132,226

(22) Filed: Apr. 7, 2023

(65) Prior Publication Data

US 2023/0244421 A1    Aug. 3, 2023

Related U.S. Application Data

(63) Continuation of application No. 17/548,458, filed on Dec. 10, 2021, now Pat. No. 11,650,769.

(30) Foreign Application Priority Data

Dec. 22, 2020 (AU) ................................ 2020294177

(51) Int. Cl.
*G06F 3/12* (2006.01)
*G06K 15/02* (2006.01)
*H04N 1/393* (2006.01)

(52) U.S. Cl.
CPC .......... *G06F 3/1208* (2013.01); *G06F 3/1242* (2013.01); *G06F 3/1252* (2013.01); *H04N 1/393* (2013.01); *G06K 15/1885* (2013.01)

(58) Field of Classification Search
None
See application file for complete search history.

(56) References Cited

U.S. PATENT DOCUMENTS

| 2005/0063000 | A1 | 3/2005 | Silverbrook et al. |
| 2006/0082793 | A1 | 4/2006 | Goel et al. |
| 2014/0195921 | A1 | 7/2014 | Grosz et al. |
| 2014/0355011 | A1 | 12/2014 | Seto |
| 2019/0258438 | A1* | 8/2019 | Izawa ................ G06K 15/1805 |
| 2020/0012460 | A1* | 1/2020 | Shibamori .............. G06F 3/125 |

OTHER PUBLICATIONS

European Search Report for application No. EP21216472 dated May 23, 2022 (Entire document, pp. 1-7).

* cited by examiner

*Primary Examiner* — Darryl V Dottin
(74) *Attorney, Agent, or Firm* — GrowIP Law Group LLC

(57) ABSTRACT

Described herein is a computer implemented method. The method includes selecting a plurality of elements on a design page and, for each selected element, determining a plurality of edge bleed pairs, each edge bleed pair including a particular edge and a particular bleed of the design page. Each edge bleed pair is processed to determine whether the selected element should be resized, the determination being based on the position of the particular edge relative to the particular bleed. If the determination is that the element should be resized, the method involves resizing the selected element so that the element covers a greater portion of the particular bleed than was originally covered by the element.

20 Claims, 10 Drawing Sheets

AUTOMATIC PRINT BLEED CORRECTION SYSTEMS AND METHODS

CROSS-REFERENCE TO RELATED APPLICATION

This application is a U.S. Continuation Application that claims priority to U.S. Non-Provisional application Ser. No. 17/548,458, filed on Dec. 10, 2021, that claims priority to Australian Patent Application No. 2020294177, filed Dec. 22, 2020, which are hereby incorporated by reference in their entirety.

FIELD

The present disclosure is directed to systems and methods for automatically identifying, suggesting corrections to address, and/or correcting potential print bleed issues in a design.

BACKGROUND

When creating designs that are to be printed (for example posters, cards, and other printed design products) print bleeds are often used to ensure that where printing is intended to extend to the edge of a final product it does.

Generally speaking, this involves creating a design with content that extends into one or more print bleeds—i.e. areas on a page that are intended to be trimmed (cut off) the final product post printing. The design is then printed on a sheet and trimmed. This ensures that where intended printing extends to the very edge of the final sheet without whitespace.

Given the accessibility of content design tools and printing services many people who prepare designs for printing are not professional designers and do not necessarily understand or use print bleeds well.

If bleeds are not properly used and printing goes ahead it may well be the case that the printed product needs to be discarded and reprinted (with correct use of bleeds). This could be the case whether a copy of the design is printed or hundreds (or thousands). This is a significant waste of resources—e.g. the sheet material being printed on; the printing inks; the energy consumption of the printer; the wear on the printer; the available printer time; and the computational processing and network activity.

Background information described in this specification is background information known to the inventors. Reference to this information as background information is not an acknowledgment or suggestion that this background information is prior art or is common general knowledge to a person of ordinary skill in the art.

SUMMARY

Described herein is a computer implemented method comprising: selecting a plurality of elements on a design page, each element associated with a set of element edges; for each selected element: determining a plurality of edge bleed pairs in respect of the selected element, each edge bleed pair including a particular edge of the set of element edges and a particular bleed of the design page; and for each edge bleed pair: processing the edge bleed pair to determine whether the selected element should be resized, the determination being based on the position of the particular edge relative to the particular bleed; and in response to determining that the element should be resized, resizing the selected element so that the element covers a greater portion of the particular bleed than was originally covered by the element.

Figure 1:
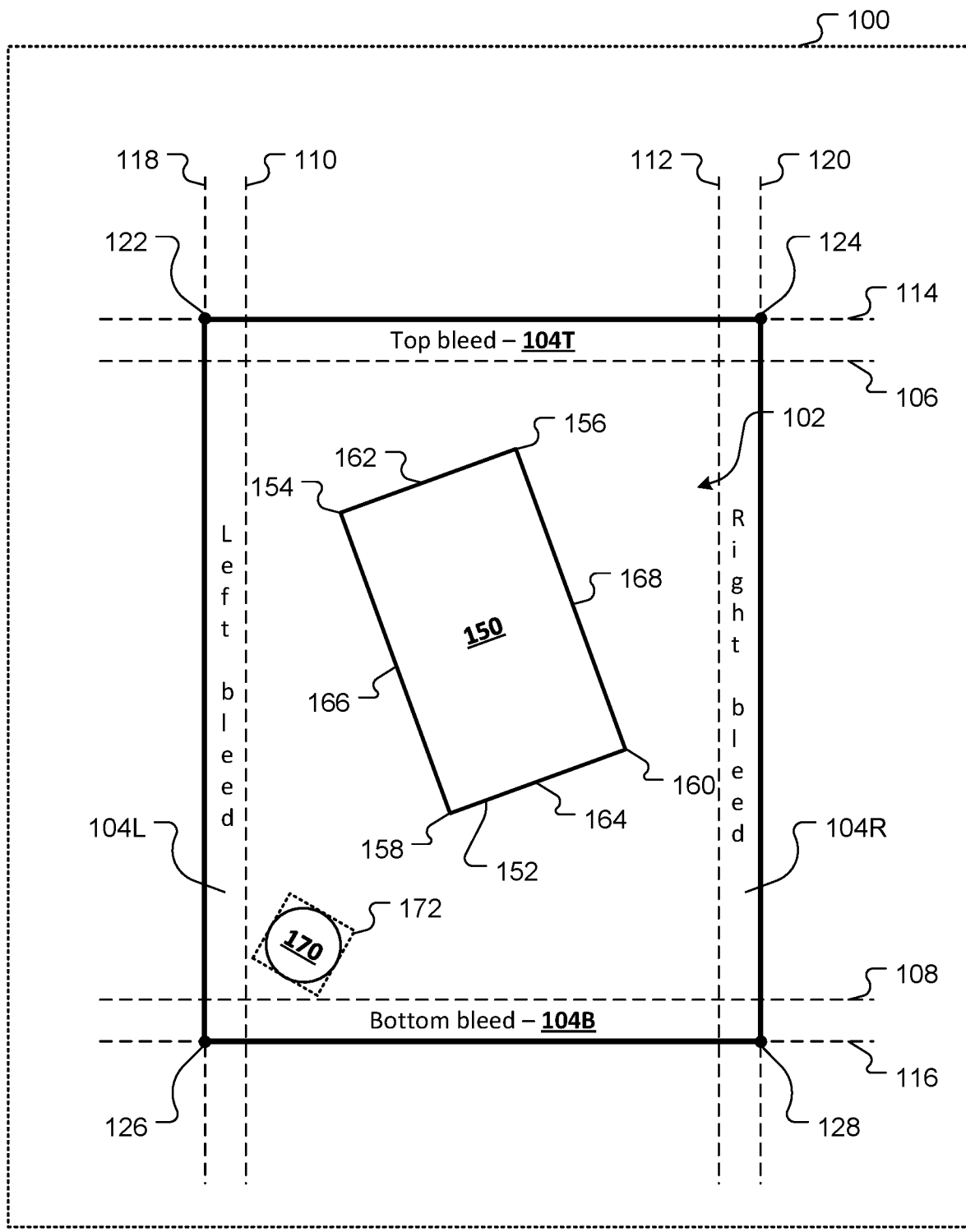
FIG. 1 depicts an example design page.

While the invention as claimed is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

In the following description numerous specific details are set forth in order to provide a thorough understanding of the claimed invention. It will be apparent, however, that the claimed invention may be practiced without these specific details. In some instances, well-known structures and devices are shown in block diagram form in order to avoid unnecessary obscuring.

Various computer implemented design tools. Such tools allow users to create designs that can then be sent to a printer (or printing service) for printing. In the present disclosure reference to printing is to two-dimensional printing on a sheet material—e.g. paper, cardboard, fabric, or other sheet material.

In some cases a printing service will simply print what is provided without review or comment. In other cases, part of the printing service may involve some level of design review to ensure, for example, a submitted design is compliant with the printer being used.

As discussed above, where a designer's intention is for printing to extend all the way to one or more edges of the sheet print bleeds can be used (and the printed product trimmed). Print bleeds are, however, often used incorrectly. In this case, unless the design is corrected, the final product may not have printing all the way to one or more edges even after trimming.

To address this issue, the present disclosure provides a process for automatically identifying and correcting (or suggesting correction of) potential print bleed errors in designs.

Designs, Design Pages, and Elements

Initially various concepts relevant to the present disclosure will be described.

Various design tools can be used to create designs. While a design that is being (or has been) created may have multiple distinct pages, the techniques described herein operate on an individual page basis.

Pages and Elements

A page as created in a design tool will have certain page attributes, for example a page identifier (typically assigned by the design tool and unique at least for the design in question), a page width, and a page height. The width and height of a page define both its size and aspect ratio.

While a design tool may allow designs to create designs with multiple distinct pages, the techniques described herein operate on an individual page basis.

A page has an associated coordinate system. Any coordinate system may be used, but in the present disclosure the page coordinate system is a Cartesian coordinate system defining a horizontal (x) axis and vertical (y) axis. In the present disclosure, the origin (x, y)=(0, 0) is the top left corner of the page with x coordinates increasing from left to right and y coordinates increasing from top to bottom.

The units of the coordinate system can be any appropriate units, for example pixels, millimetres, centimetres, inches, or an alternative unit.

In the embodiments described herein, a page (e.g. the page identifier) is associated with a list of design elements. A page's design element list is used to record all design elements that have been added to the page—e.g. a set (such as a list or array) of design elements.

Page (and element data) may be stored in a device independent design descriptor. By way of example, a design descriptor may be stored in a JSON format file such as the following:

```
{
  "design": {
    "id": "abc123",
    "creationDate": "1-jun-2020",
    "dimensions": {
      "width": 1080,
      "height": 1080
    },
    "elements": [
      {...},
      {...},
      ...
      {...}
    ],
  }
}
```

In this example, the design descriptor includes design metadata (e.g. a design identifier, a design creation date), page dimensions (a height and a width), and an elements array, each item of which is an element descriptors describing an element (or group of elements) that has been added to the page (described below).

Design elements (elements for short) are objects that are added to a page. Elements may be copied or imported from one or more element libraries (e.g. libraries of images, animations, videos, etc.). Alternatively, elements may be drawn or created using one or more design tools, for example a text tool, a line tool, a rectangle tool, an ellipse tool, a curve tool, a freehand tool, and/or other design tools or combinations thereof.

An element that has been added to a page (and added to the page's element list) may be identified in various ways. For example, an element may be identified by its position (index) in the element list. Alternatively (or in addition) an element may be assigned an element identifier that is unique at least within the page that the element has been added to.

A given design element has associated element attributes. The particular element attributes that are or can be associated with a given element may depend on the type of element in question. By way of example, however, element attributes may include one or more of those shown in the table below:

| Element attribute | Description |
|---|---|
| Identifier | Identifier for the element (unique at least within the page the element has been added to). Alternatively, the position (index) of the element within an element list may be used to identify an element. |
| Type | A value identifying a type of the element. |
| Top | The y coordinate of the element's origin (e.g. y coordinate of the top left corner). |
| Left | The x coordinate of the element's origin (e.g. x coordinate of the top left corner). |
| Width | A value defining the width of the element. |
| Height | A value defining the height of the element. |
| Rotation | A value defining a degree of rotation of the element, e.g. a value x such that −180 degrees <= x <= +180 degrees. |
| Opacity | Data defining any transparency applied to the element. |
| x-flipped data | For example a Boolean indicating whether the element has been flipped in the x dimension. |
| y-flipped data | For example a Boolean indicating whether the element has been flipped in the y dimension. |
| Media reference | Data defining a fill of an element (e.g. a rectangular element)—for example an identifier of a library element image, video, or other media file used to fill the element. |
| Children | Data in respect of child elements (where the element is a group) |

Additional (and/or alternative) element attributes are possible.

An element is of a particular defined type—in the above example defined by an element's type attribute. For example, an element type may be: text; chart; image; grid (e.g. a grid of images); table (of data); line; vector shapes; group (indicating the element is, in fact, a group of elements), and/or other element types.

In the bleed auto correction process described herein only certain defined element types are eligible to be considered for auto correction. Generally speaking, ineligible elements are elements which are unlikely to be appropriate for automatic extension into (and beyond) a bleed. For example, text, chart, table, and line type elements are ineligible while rectangle, vector shape, and image grid type elements are eligible.

In addition, in certain embodiments elements (or element types) may be associated with an extension axis flag or attribute which has a value that indicates whether the element can be extended in a single dimension (for example rectangular elements which can be extended in the x or y dimension alone) or the element must be extended in both dimensions to maintain its aspect ratio/prevent skewing/ distortion (for example circular elements which must be uniformly extended along the x and y dimensions together).

In alternative embodiments, elements that would require extension in both dimensions are ignored (i.e. treated as ineligible element types).

Element attributes for a given element may be stored in an element descriptor (which is included in the page's element list). For example:

```
{
    "design": {
        ...
    },
    "elements": [
        {
            "type": "IMAGE",
            "top": 100,
            "left": 100,
            "width": 500,
            "height": 400,
            "rotation": 0,
            "opacity": 1,
            "mediaReference": "abc123"
        }
    ],
}
```

Any appropriate value may be used for rotation (e.g. degrees or radians). Rotation may be about a predefined constant pivot point (e.g. a centre point of the element (e.g. (((origin x coordinate+width)/2), ((origin y coordinate+height)/2)), the origin (i.e. top/left coordinates), a corner of the element, or an alternative predefined constant pivot point. Alternatively, rotation may be about a pivot point that is defined for each individual element, either by a user or automatically (e.g. a pair of pivot coordinates (pivot x, pivot y)).

Where an element is a member of an element group the elements origin (top/left coordinates), rotation, x-flipped data, and y-flipped data are relative to the group the element is a member of. This is discussed further below. If an element is not a member of a group, these attributes are with respect to the page as a whole.

When an element is added to the page the element (or element identifier) is added to the page's element list/array. Absent explicit user manipulation, elements are added to the page's element list in the order they are added to the page. In some implementations, the first item in the page's element list (i.e. list index 0) will be a background element. In this case, the first element added to the page by a user becomes the second item in the page's element list (index 1 of the list), the next element added becomes the third item in the page's element list (index 2 of the list) and so forth.

Constructing a page's element list in this manner means that an element's position (index) in the element list also defines its depth or z-index in the page: i.e. an element at index n is behind an element at index n+1 and in front of an element at index n−1. Where a given element is in front of one or more other elements it can, depending on position/size/rotation/transparency, occlude or partially occlude any/all elements it is in front of. I.e. an element at index n is in front of all elements with an index of <n.

In alternative embodiments element depth may be an explicitly stored design element attribute.

Design tools typically provide mechanisms for a user to manually adjust an element's depth, for example by bringing forward, sending backwards, bringing to front, sending to back. If such adjustments are made, corresponding changes are made to the order of the page's element list.

Page Bleeds and Associated Element Features

FIG. 1 depicts a design canvas 100 on which a page 102 is shown. The design canvas 100 may be limited to the dimensions of the page 102 or be any other dimension (or unbounded). The page 102 defines an area that is intended to be printed as a discrete whole—e.g. on a single sheet.

A page 102 has four bleeds 104. In this disclosure the following naming convention will be adopted: 'T' for top; 'B' for bottom; 'L' for left; 'R' for right. Accordingly, the four bleeds 104 of a page 102 are: a top bleed 104T, bottom bleed 104B, a left bleed 104L a right bleed 104R.

Each bleed 104 has the following defined or computed parameters

A bleed orientation which may be horizontal (as per top and bottom bleeds 104T and 104B) or vertical (as per the left and right bleeds 104L and 104R).

A bleed longitudinal axis.

A bleed transverse axis.

A bleed inner coordinate that defines the bleed's inner edge in the transverse axis (i.e. a vertical bleed's inner coordinate is an x-coordinate and a horizontal bleed's inner coordinate is a y-coordinate). The inner edge of a bleed is the edge along which trimming occurs after the page has been printed.

A bleed outer coordinate that defines the bleed's outer edge (in the transverse axis). The outer edge of a bleed is the edge of the sheet on which the page is printed.

A bleed minimum coordinate (or bleed minimum) which is the minimum coordinate of the bleed 104 in the bleed's longitudinal axis.

A bleed maximum coordinate (or bleed maximum) which is the maximum coordinate of the bleed 104 in the bleed's longitudinal axis.

A bleed direction which indicates whether moving from the bleed's inner to outer edge is in the positive or negative direction along the bleed's transverse axis. This parameter can be computed from other parameters (e.g. the bleed's inner and outer coordinates).

A bleed's extremities, which are the furthest points of the bleed from the centre of the page. This is the intersection of the bleed's minimum/maximum and outer edge.

In FIG. 1, and within the present coordinate system, the parameters of bleeds 104T/B/L/R are as follows:

| | Top bleed 104T | Bottom bleed 104B | Left bleed 104L | Right bleed 104R |
|---|---|---|---|---|
| Orientation | Horizontal | Horizontal | Vertical | Vertical |
| Longitudinal axis | x axis | x axis | y axis | y axis |
| Transverse axis | y axis | y axis | x axis | x axis |
| Inner coordinate/edge | y coordinate of inner edge 106 | y coordinate o finner edge 108 | x coordinate of inner edge 110 | x coordinate o finner edge 112 |
| Outer coordinate/edge | y coordinate of outer edge 114 | y coordinate of outer edge 116 | x coordinate of outer edge 118 | x coordinate of outer edge 120 |
| Minimum coordinate | left bleed outer (x) coordinate | left bleed outer (x) coordinate | top bleed outer (y) coordinate | top bleed outer (y) coordinate |
| Maximum coordinate | right bleed outer (x) coordinate | right bleed outer (x) coordinate | bottom bleed outer (y) coordinate | bottom bleed outer (y) coordinate |
| Direction | Negative | Positive | Negative | Positive |
| Extremities | 122 and 124 | 126 and 128 | 122 and 126 | 124 and 128 |

Typically print bleeds are 3 mm in width (i.e. the distance between a bleed's inner coordinate/edge and outer coordinate/edge is 3 mm), however alternative bleed widths are possible (e.g. 5 mm or any other bleed width). Bleed width for a page may be a standard/default page parameter. Alternatively bleed width(s) may be user editable attributes stored as (for example) in a design descriptor as described above. In this case a user may be able to edit bleeds collectively (i.e. so that all bleeds are the same width) or individually (i.e. so that different bleeds have different widths).

Page 102 includes a rectangular element 150 which (in this example) has been rotated by 20 degrees and is positioned entirely within page 102 (i.e. within the outer edges of the bleeds 104).

An element such as 150 that has been added to a page 102 has an associated set of element edges. In the present embodiments, the set of element edges associated with an element such as 150 are the four edges of a rectangular bounding box 152 that bounds the element 150. Where an element is a rectangle (such as element 150) the element's bounding box 152 (and therefore the set of element edges) is coextensive (or substantially coextensive) with the edges of the element itself.

For non-rectangular elements (e.g. circles, ellipses, non-rectangular polygons, free-form vector drawings and the like) a rectangular bounding box that surrounds the element is calculated, and the edges of the bounding box are the edges of the set of element edges. For example, element 180 is a circle that has been rotated by −30 degrees and has rectangular bounding box 172.

In the present disclosure, an element's bounding box is defined by its four corners—for example, for bounding box 152: a first (in this case top left) corner 154; a second (in this case top right) corner 156; a third (in this case bottom left) corner 158; and a fourth (in this case bottom right) corner 160. Each bounding box corner may be defined by an (x, y) coordinate pair, which can be calculated based on the position (e.g. top and left attributes) size (e.g. width and height attributes) and rotation of the element.

The bounding box corners define, in turn, four bounding box edges—for bounding box 152; a first (in this case top) edge 162 (being a straight line between the first corner 154 and second corner 156); a second (in this case bottom) edge 164 (being a straight line between the third corner 158 and fourth corner 160); a third (in this case left) edge 166 (being a straight line between the first corner 154 and third corner 158); and a fourth (in this case right) edge 168 (being a straight line between the second corner 156 and fourth corner 160). A bounding box edge may be defined by a pair of (x, y) coordinate pairs (i.e. the corner coordinate pairs).

Notably, the first corner 154 will not always be the top left corner and the first edge will not always be the left edge, as rotation of an element may well change these relative positions. For example if element 15 was rotated by 90 degrees the 'top left' corner 154 would in fact be the bottom left corner and the 'top' edge 162 would in fact be the 'left' edge.

In the bleed auto correct process described below the edges of a bounding box are determined to be either vertically oriented or horizontally oriented (a given bounding box having two edges of each orientation). In the example of FIG. 1:

| Bounding box edge | Edge orientation | Opposite edge |
|---|---|---|
| 162 (top) | Horizontal | 164 (bottom) |
| 164 (bottom) | Horizontal | 162 (top) |
| 166 (left) | Vertical | 168 (right) |
| 168 (right) | Vertical | 166 (left) |

Networked Environment

As noted, the present disclosure provides a process for automatically identifying and correcting (or suggesting correction for) potential print bleed errors in a design. The processing performed, which is described in detail below, can be performed in various contexts (and by various systems).

Figure 2:
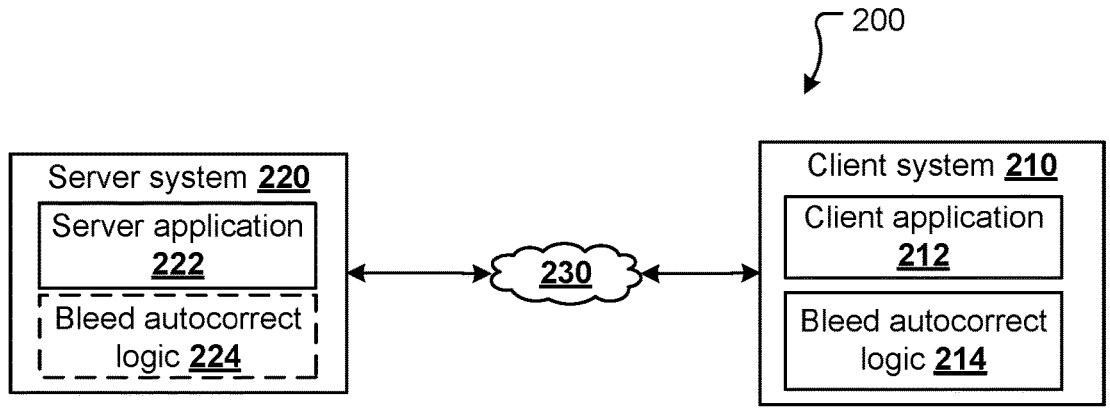
FIG. 2 is a block diagram illustrating an example environment in which features of the present disclosure can be implemented.

Turning to FIG. 2, one example of a networked environment 200 in which the various operations and techniques described herein can be performed will be described.

Networked environment 200 includes a client system 210 and a server system 220 that are interconnected via a communications network 230 (e.g. the Internet).

Client system 210 is an end user system that is operated by a user to, for example, prepare designs for printing and/or cause designs to be printed. Printing may be via a locally or remotely accessible printer or via a printing service (provided, for example, via server system 220 or an alternative server system).

Client system 210 hosts a client application 212 which, when executed by the client system 210, configures the client system 210 to provide client-side functionality for/ interact with the server application 222 of the server system 220.

The functionality of client application 212 may be provided by a web browser application which accesses the server application 222 via an appropriate uniform resource locator (URL) and communicates with the server application 222 via general world-wide-web protocols (e.g. http, https, ftp).

Alternatively, client application 212 may be a specific/ native application programmed to communicate with the server application 222 using defined application programming interface (API) calls.

Via the client application 212 a user can interact with the server application 222 in order to perform various operations. Depending on the client and server applications 212 and 222 these operations may include operations such as creating, editing, saving, retrieving/accessing, publishing, sharing, and/or printing designs.

In the example of FIG. 2, the client system 210 is configured to locally perform a bleed auto correct process such as that described below. Client system 210 is configured to do so by, in this example, bleed autocorrect logic 214. The bleed autocorrect logic 214 may be implemented by hardware or software. Where implemented by software, the bleed autocorrect logic 214 may be native to client application 212, provided to client application 212 by an add-on or plug-in that extends the functionality thereof, or provided by a separate application that runs on client system 210 and is invoked (by client application 212 or directly by a user) as required.

Client system 210 may be any computer processing system which is configured (or configurable) by hardware and/or software to offer client-side functionality. By way of example, client system 210 may be a desktop computer, a laptop computer, a netbook computer, a tablet computing device, a mobile/smart phone device, a personal digital assistant, or an alternative computer processing system.

Although not illustrated in FIG. 2, client system 210 will typically have additional applications installed thereon, for example at least an operating system application.

Server system 220 hosts a server application 222. The server application 222 is executed by a computer processing system of the sever system 220 to configure that system to provide server-side functionality to one or more corresponding client applications (e.g. client application 212 described above). The server-side functionality may include administrative functions (such as user account management, login, etc.), and design creation/editing functions (for example creating, saving, publishing, sharing designs) and/or print functions (e.g. to define various print parameters and cause a design to be printed).

To provide the server-side functionality, the server application 222 comprises one or more application programs, libraries, APIs or other software elements. For example, where the client application 212 is a web browser, the server application 222 will be a web server such as Apache, IIS, nginx, GWS, or an alternative web server. Where the client application 212 is a specific/native application, the server application 222 will be an application server configured specifically to interact with that client application 222. Server system 220 may host with both web server and application server modules.

Server system 220 will typically include additional components to those illustrated. For example, sever system 220 will typically include one or more data storage systems or applications (and data storage devices) for storing various data required by the server system 220 in the course of its operations. Such data may include, for example, user account data, design template data, design element data, and data in respect of designs that have been created by users. Where sever system 220 provides printing functionality it will typically include one or more print servers (which, in turn, interface with one or more physical printers).

The precise hardware architecture of server system 202 will vary depending on implementation, however may well include multiple computer processing systems (e.g. server computers) which communicate with one another either directly or via one or more networks, e.g. one or more LANS, WANs, or other networks (with a secure logical overlay, such as a VPN, if required).

For example, server application 222 may run on a single dedicated server computer. Alternatively, server system 220 may be a cloud computing system and configured to commission/decommission resources based on user demand. In this case there may be multiple server computers (nodes) running multiple server applications 222 which service clients via a load balancer.

The architecture described above and illustrated in FIG. 2 is provided by way of example only, and variations are possible.

For example, client system 210 may be configured to operate and perform a print bleed autocorrect process as described above entirely independently of a server system such as 220. In this case client application 212 (including bleed autocorrect logic 214) is a stand-alone application by which a user can, for example, create, edit, and ready designs for printing. Printing may then be performed on a locally accessible printer or via a remote printer (e.g. by transferring the design to a remote printer via a network, portable disk-drive, electronic communication, or alternative means).

Alternatively, instead of client system 210 being provided with bleed autocorrect logic 214 such logic may be provided (and the bleed autocorrect process performed by) a server system such as 220. In this case the server system 220 receives a design that is to be prepared for printing (and/or printed). The design may be received from a client application 212 or independently of such a client application, for example via an electronic communication (e.g. email/sms/instant message or other communication), via a network upload (e.g. http or ftp upload), via a physical upload (e.g. from a portable memory device), or any other means. As part of preparing the design for printing, server application 222 may then invoke print bleed autocorrect logic (e.g. 224) to perform a print bleed autocorrect process as described above.

Example Computer Processing System

The features and techniques described herein are implemented using one or more computer processing systems.

For example, in networked environment 200 described above, client system 210 is a computer processing system (for example a personal computer, tablet/phone device, or other computer processing system). Similarly, the various functional components of server system 202 are implemented using one or more computer processing systems (e.g. server computers or other computer processing systems).

Figure 3:
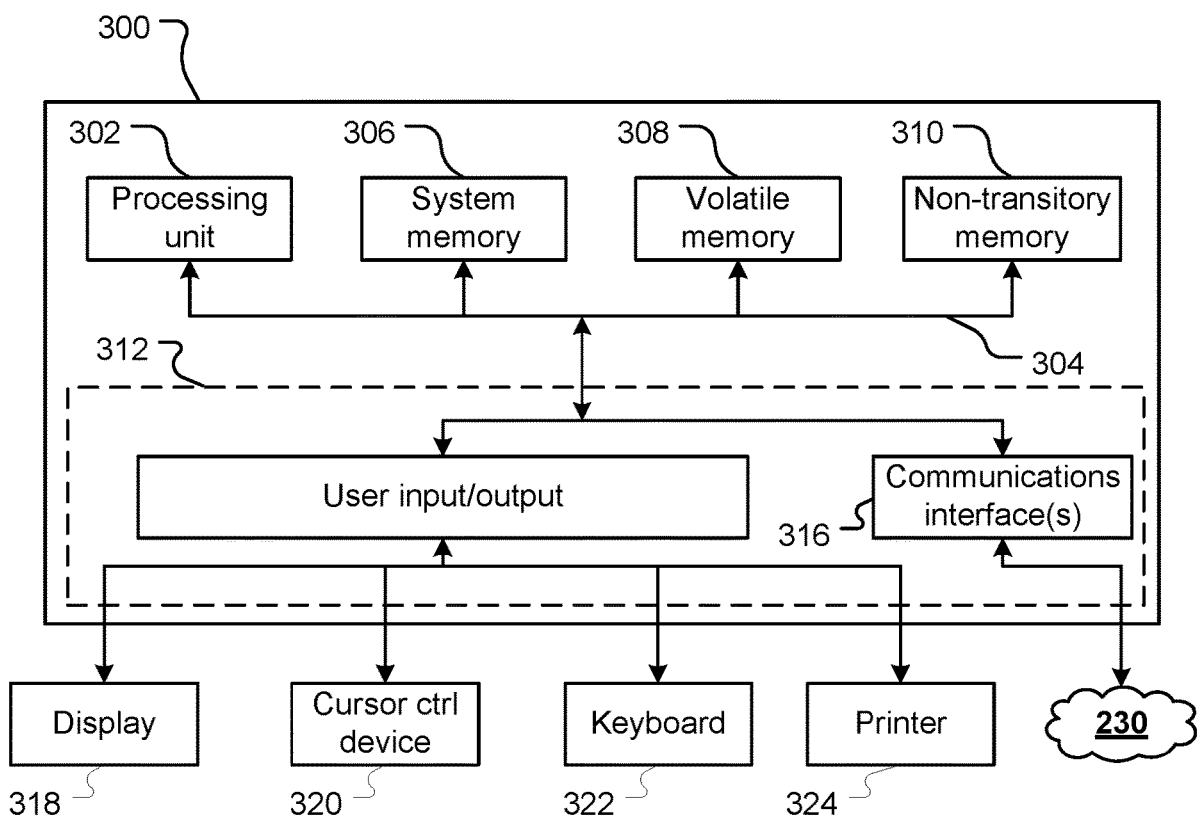
FIG. 3 is an example computer processing system configurable to perform various features described herein.

FIG. 3 provides a block diagram of a computer processing system 300 configurable to implement embodiments and/or features described herein. System 300 is a general purpose computer processing system. It will be appreciated that FIG. 3 does not illustrate all functional or physical components of a computer processing system. For example, no power supply or power supply interface has been depicted, however system 300 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 300 includes at least one processing unit 302. The processing unit 302 may be a single computer processing device (e.g. a central processing unit, graphics processing unit, or other computational device), or may include a plurality of computer processing devices. In some instances, where a computer processing system 300 is described as performing an operation or function all processing required to perform that operation or function will be performed by processing unit 302. In other instances, processing required to perform that operation or function may also be performed by remote processing devices accessible to and useable by (either in a shared or dedicated manner) system 300.

Through a communications bus 304 the processing unit 302 is in data communication with a one or more machine readable storage (memory) devices which store instructions and/or data for controlling operation of the processing system 300. In this example, system 300 includes a system memory 306 (e.g. a BIOS), volatile memory 308 (e.g. random access memory such as one or more DRAM modules), and non-volatile memory 310 (e.g. one or more hard disk or solid state drives).

System 300 also includes one or more interfaces, indicated generally by 312, via which system 300 interfaces with various devices and/or networks. Generally speaking, other devices may be integral with system 300, or may be separate. Where a device is separate from system 300, connection between the device and system 300 may be via wired or wireless hardware and communication protocols, and may be a direct or an indirect (e.g. networked) connection.

Wired connection with other devices/networks may be by any appropriate standard or proprietary hardware and connectivity protocols. For example, system 300 may be configured for wired connection with other devices/communications networks by one or more of: USB; FireWire; eSATA; Thunderbolt; Ethernet; OS/2; Parallel; Serial; HDMI; DVI; VGA; SCSI; AudioPort. Other wired connections are possible.

Wireless connection with other devices/networks may similarly be by any appropriate standard or proprietary hardware and communications protocols. For example, system 300 may be configured for wireless connection with other devices/communications networks using one or more of: infrared; BlueTooth; WiFi; near field communications (NFC); Global System for Mobile Communications (GSM), Enhanced Data GSM Environment (EDGE), long term evolution (LTE), wideband code division multiple access (W-CDMA), code division multiple access (CDMA). Other wireless connections are possible.

Generally speaking, and depending on the particular system in question, devices to which system 300 connects—whether by wired or wireless means—include one or more input devices to allow data to be input into/received by system 300 for processing by the processing unit 302, and one or more output device to allow data to be output by system 300. Example devices are described below, however it will be appreciated that not all computer processing systems will include all mentioned devices, and that additional and alternative devices to those mentioned may well be used.

For example, system 300 may include or connect to one or more input devices by which information/data is input into (received by) system 300. Such input devices may include keyboards, mice, trackpads, microphones, accelerometers, proximity sensors, GPS devices and the like. System 300 may also include or connect to one or more output devices controlled by system 300 to output information. Such output devices may include devices such as a CRT displays, LCD displays, LED displays, plasma displays, touch screen displays, speakers, vibration modules, LEDs/other lights, and such like. System 300 may also include or connect to devices which may act as both input and output devices, for example memory devices (hard drives, solid state drives, disk drives, compact flash cards, SD cards and the like) which system 200 can read data from and/or write data to, and touch screen displays which can both display (output) data and receive touch signals (input).

By way of example, where system 300 is a client system such as 210 it will include at least a display 318 (which may be a touch screen display) and, potentially one or more (additional) input devices such as a cursor control device 320 (e.g. a mouse, trackpad, or other cursor control device) and a keyboard 322.

Where computer processing system 300 connects to a printer to print designs, system 300 may be directly connected to a printer 324 (as illustrated in FIG. 3). System 300 may also, or alternatively, connect to one or more printers over a network (e.g. a local area network or public network such as the Internet) via communications interface 230.

System 300 also includes one or more communications interfaces 316 for communication with a network, such as network 230 of environment 200 (and/or a local network within the server system 220). Via the communications interface(s) 316 system 300 can communicate data to and receive data from networked devices, which may themselves be other computer processing systems.

System 300 may be any suitable computer processing system, for example, a server computer system, a desktop computer, a laptop computer, a netbook computer, a tablet computing device, a mobile/smart phone, a personal digital assistant, or an alternative computer processing system.

System 300 stores or has access to computer applications (also referred to as software or programs)—i.e. computer readable instructions and data which, when executed by the processing unit 302, configure system 300 to receive, process, and output data. Instructions and data can be stored on non-transitory machine readable medium accessible to system 300. For example, instructions and data may be stored on non-transitory memory 310. Instructions and data may be transmitted to/received by system 300 via a data signal in a transmission channel enabled (for example) by a wired or wireless network connection over interface such as 312.

Applications accessible to system 300 will typically include an operating system application. System 300 also stores or has access to applications which, when executed by the processing unit 302, configure system 300 to perform various computer-implemented processing operations described herein.

For example, and referring to the networked environment of FIG. 1 above: client system 210 includes a client application 212 which configures the client system 210 to perform the operations described herein.

In some cases, part or all of a given computer-implemented method will be performed by system 300 itself, while in other cases processing may be performed by other devices in data communication with system 300.

Design Creation and Editing

Figure 4:
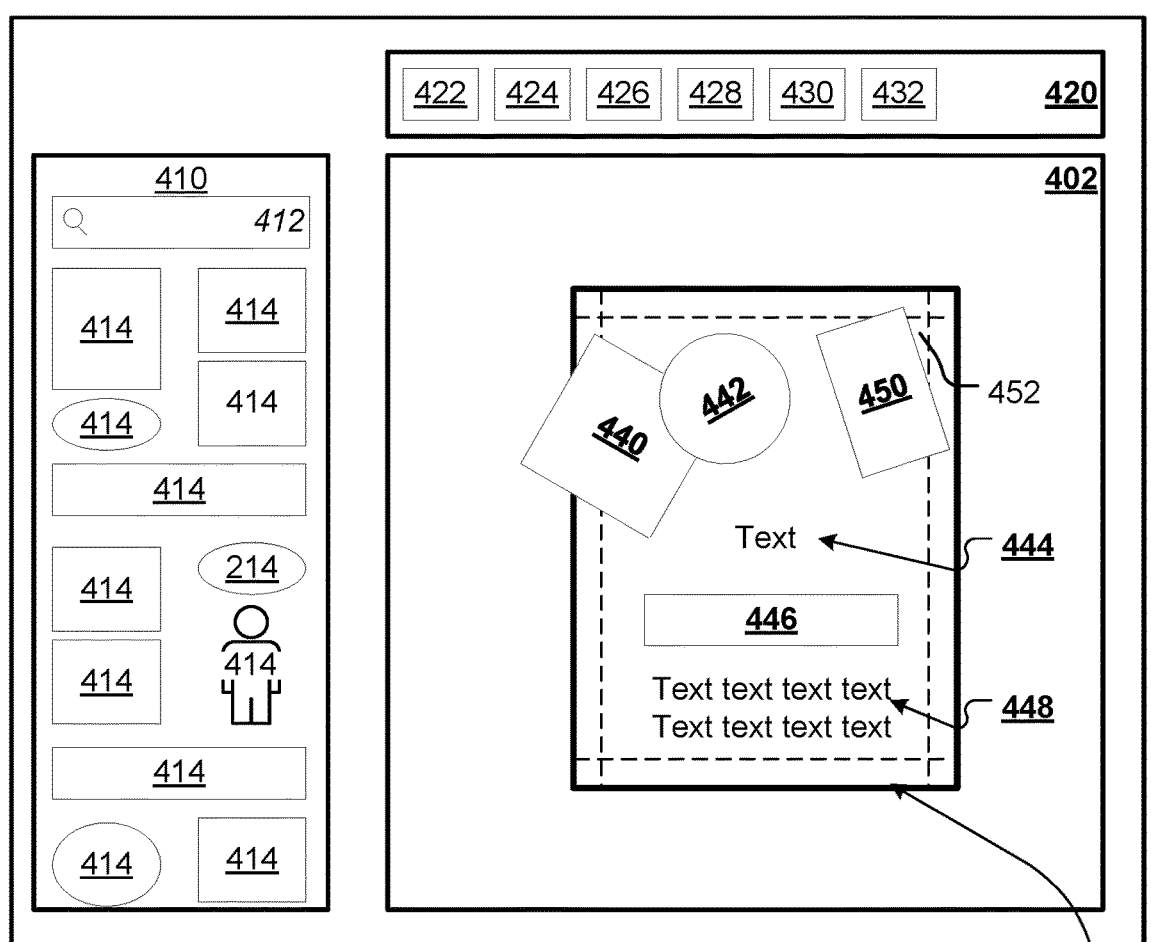
FIG. 4 provides an example of a design creation user interface.

The particular manner in which a design is created is not of specific relevance to the present disclosure. In order to provide context, however, one example of a design creation user interface 400 will be described with reference to FIG. 4.

Design creation user interface 200 is displayed on a display 318 of a client system 210, the client system 210 configured to do so by a client application 212.

Via interface 400 a user can create a design document that comprises one or more pages and (inter alia) add elements to the page. Example design creation interface 400 includes a design creation pane 402 in which the design currently being worked on is displayed. In the present example, design creation pane 402 shows a single page 404 of a design document.

Design creation interface 400 also includes a design element search and selection pane 410 via which a user can search or browse one or more design element libraries, view design element previews 414, and select design elements to be included in the design. To this end, pane 410 includes a search box 412 (allowing in this case a user to enter search text) and design element previews 414 providing preview images of design elements.

Design creation interface 400 also includes a toolbar 420 providing various tools for design creation and editing. In this particular example the tools include: an element selection tool 422 allowing a user to select a particular design element that has been added to the page 404; a drawing tool 424 allowing a user to draw a design element having a geometric or other shape; a text tool 426 allowing a user to add a textual design element; a colour tool 428 allowing a user to manually adjust one or more colours of a given design element; an import tool 430 allowing a user to import an element from another source (e.g. an element stored on locally or remotely accessible memory, an element from a third party server, etc.).

In the present example, toolbar 420 also includes a print bleed auto correction control 432, activation of which triggers an automatic print bleed correction process as described below.

While not shown, toolbar 420 will typically be an adaptive toolbar in that the tools provided change depending on what the user is doing. As one example, while the print bleed auto correction control 432 is depicted as a top-level control it may be provided as a sub control. For example toolbar 420 may include a 'print' control which, when activated, displays a print menu which includes a print bleed auto correction control 432.

Generally speaking, in order to create a design a user creates a page and adds design elements to that page. Design elements can be added in various ways. For example, a user can interact with the design element search and selection pane 410 to search/browse for design elements and then add elements to the design being created—e.g. by selecting a design element preview 414, dragging it to a position on the page 404, and dropping it (or simply double clicking/alternatively interacting with the element preview 414). Alternatively, a user may create and add an entirely new element—e.g. by drawing an element using a tool such as drawing tool 424 or adding custom text via text tool 426. Further alternatively, a user may import an element via import tool 430.

In this specific example, page 404 includes six design elements: a first rectangular element 440 (rotated by −30 degrees); a circular element 442 (atop the rectangular element 440 and rotated by +30 degrees); a first text element 444; a second rectangular element 446; a second text element 448; and a third rectangular element 450 (rotated by +18 degrees).

In this example, the first rectangular element 440 is partially off-page (i.e. part of the element is beyond the left bleed's outer edge). The third rectangular element 450 extends into both the top and right bleeds of the page. The angle of element 450 is such that an area of white space 452 is left between the element's right edge and the top and right inner bleed edges.

Once an element has been added to the page it is added to the page's element list and the user can interact further with it—e.g. by adjusting its position, size (height and/or width), its depth with respect to other design elements on the page 404 (e.g. bringing forward, moving backward, bringing to front, moving to back), moving it to another page of the design document, changing its rotation, flipping it about an axis, adjusting colours, deleting it, duplicating it, adding it to a group, removing it from a group, etc.

Interface 400 is provided by way of example only, and alternative design creation interfaces (with alternative user interface elements and controls) are possible.

Print Bleed Auto Correction

A print bleed auto correction process 500 will be described. Process 500 operates to automatically detect potential print bleed errors in a design and correct (or provide a suggested correction) thereof.

The operations of process 500 are described as being performed by client system 210 (or simply system 210 for short in the context of process 500). In certain implementations system 210 is configured to perform the processing described by client application 212 (and bleed autocorrect logic 214). As noted above, however, process 500 (or elements thereof) may be performed by an alternative system—e.g. a server system 220.

Generally speaking, process 500 involves performing a pair-wise comparison between each bounding box edge of an eligible element and each bleed of the page that is relevant to that edge (horizontal bleeds being relevant to horizontally oriented edges and vertical bleeds being relevant to vertically oriented edges). This is repeated for every eligible element on the page. For a given bounding box edge/bleed pair (also referred to as edge/bleed pairs), a determination is made as to whether the element in question should be resized in order to increase the element's coverage of the bleed and, if so, to resize the element accordingly. Generally speaking, this determination is based on the position of the edge relative to the bleed.

In the present embodiments, a given edge/bleed pair may be processed in accordance with two distinct extension methods. These are referred to as the corner extension method (described with reference to FIGS. 6 and 7) and distance extension method (described with reference to FIGS. 8 and 9). Each extension method involves determining whether the element should be extended and, if so, extending the element.

More specifically, if the corner extension method determines an element should be extend it operates to extend the element until both corners of the element's bounding box sit (in the described embodiments) just outside of the bleed 104 in question. The corners of the element's bounding box could, alternatively, be extended to sit on the outer bleed edge.

In contrast, if the distance extension method determines an element should be extended it operates to extend an element until the element's bounding box edge sits just outside (or on) a selected bleed extremity.

In the present embodiments, the distance extension method will always yield a smaller or equal extension to that determined by the corner extension method. For this reason, the print bleed auto correct process initially processes an edge/bleed pair in accordance with the corner extension method and only processes the pair in accordance with the distance extension method if the corner extension method is not applicable.

In alternative embodiments, a bleed auto correct process may involve only the corner extension method (or an adaptation thereof), only the distance extension method (or an adaptation thereof), or either/both of the extension methods in conjunction with additional extension methods.

Operations of the print bleed auto correction process 500 are divided into four main parts: operations in respect of selecting and iterating through each relevant edge/bleed pair are described with reference to FIG. 5; operations involved in processing a specific edge/bleed pair according to the corner extension method 600 are described with reference to FIGS. 6 and 7; operations involved in processing a specific edge/bleed pair according to the distance extension method 800 are described with reference to FIGS. 8 and 9; and operations involved in a design approval process 1000 are described with reference to FIGS. 10 and 11.

Edge/Bleed Pair Selection

At 502, system 210 detects a print bleed auto correction trigger event.

Various trigger events are possible. By way of example, where process 500 is performed by a client system such as 210 trigger events may include one or more of: system 210 detecting activation of a print bleed auto correction control such as 432 described above; system 210 detecting activation of a print control; system 210 detecting a user submitting/uploading/sending a design to a print service (provided, for example, by a remote server 220); or an alternative trigger event.

By way of alternative example, where process 500 is performed by a server system such as 220 (e.g. a server of a printing service), the trigger event may be receiving a design for printing.

As noted, the auto correction process described herein operates on a page-by-page basis. Where a design has multiple pages each page may be processed in turn (or in parallel).

In the present example, any element groups are ignored (i.e. each eligible element is considered separately whether it is a member of a group or not).

At 504, system 210 selects the next unprocessed eligible element on the page being processed. Elements may be processed in any order—for example in depth order (from lowest to highest depth). As noted above, not all elements are eligible for processing by the bleed auto correct process 500. Elements that are not of an eligible type (e.g. text elements, chart elements, other ineligible elements) are ignored/not processed.

In certain embodiments, any non-rectangular element may be ineligible (i.e. bleed auto correct process 500 is configured to only consider rectangular elements). In this case, references to an element's bounding box corners and edges in process 500 can be replaced by references to the corners and edges of the element itself.

At 506, system 210 calculates (or accesses if already calculated/stored) edges in respect of the selected element and edge orientations (vertical or horizontal, as described above). As described above, the edges in respect of the selected element may be the edges of the element itself (for example where the element is a rectangular shaped element) or edges of the element's bounding box.

As noted, each bounding box edge may be defined by a pair of corners (each corner in turn defined by a pair of corner coordinates). To determine the orientation of a given bounding box edge system 210 initially calculates an angle ($\theta$) of the bounding box edge—for example according to the following:

if $x_1 = x_2 : \theta = 90°$ else: $\theta = \arctan\left(\dfrac{y_2 - y_1}{x_2 - x_1}\right)$ $\theta$ is then normalised so its value is in the range [−180, 180], for example according to the equation $\theta = \theta - 360° * \text{floor}((\theta+180°)/360°)$ Where ($x_1,y_1$)=coordinate of one corner of bounding box edge ($x_2,y_2$)=coordinate of other corner of bounding box edge The calculated angle $\theta$, therefore, represents the angle between the bounding box edge and the positive x-axis (angle of inclination).

System 210 calculates orientation based on the edge's angle $\theta$ which, from the above calculation, is a value between −180 and 180 degrees:

$0° < |\theta| \leq 45°$ → horizontally oriented bounding box edge $45° < |\theta| \leq 90°$ → vertically oriented bounding box edge $90° < |\theta| \leq 135°$ → vertically oriented bounding box edge $135° < |\theta| \leq 180°$ → horizontally oriented bounding box edge At 508, system 210 selects the next unprocessed bounding box edge. The bounding box edges of a selected element may be processed in any order (e.g. left, right, top, bottom or any other order).

At 510, system 210 selects the next unprocessed correspondingly oriented bleed. A given bounding box edge will have two correspondingly oriented bleeds: the top and bottom (i.e. horizontal) bleeds for a horizontally oriented bounding box edge; the left and right (i.e. vertical) bleeds for a vertically oriented bounding box edge. The two correspondingly oriented bleeds for a given bounding box edge may be processed in either order.

Following 510, therefore, an edge/bleed pair has been selected (the edge/bleed pair including a particular edge of the element's bounding box (or the element itself) and a particular bleed of the page). System 210 then proceeds to determine if the element should be extended by an extension method. In this case, system 210 initially processes the edge/bleed pair according to the corner extension method 600 (described below with reference to FIG. 6). If the corner extension method applies (and the element is extended in accordance therewith) processing proceeds to 512. If the corner extension method does not apply, system 210 processes the bounding box edge/bleed pair according to the distance extension method 800 (described below with reference to FIG. 8). On completion of the distance extension method processing (whether the element is extended or not) processing proceeds to 512.

At 512, therefore, the currently selected edge/bleed pair has been processed according to (in this example) one or both of the extension methods (and may have been adjusted by one of the extension methods or not adjusted). System 210 then determines whether there is an unprocessed correspondingly oriented bleed for the currently selected edge. If there is an unprocessed correspondingly oriented bleed for the currently selected edge, processing returns to 510 where the unprocessed correspondingly oriented bleed for the current bounding box edge is selected. If both correspondingly oriented bleeds for the edge have been processed, processing of the current bounding box edge is complete and processing proceeds to 514.

At 514, system 210 determines whether there are any unprocessed bounding box edges of the currently selected element. If there are one or more unprocessed bounding box edges, processing returns to 508 to select the next unprocessed bounding box edge. If not, and all four edges have been processed, processing of the currently selected element is complete and processing proceeds to 516.

At 516, system 210 determines whether there are any unprocessed eligible elements. If so, processing returns to 504 to select the next eligible element to process. If not, and in the present example, processing proceeds to 1002 of design approval process 1000 (FIG. 10).

Corner Extension Method

Figure 6:
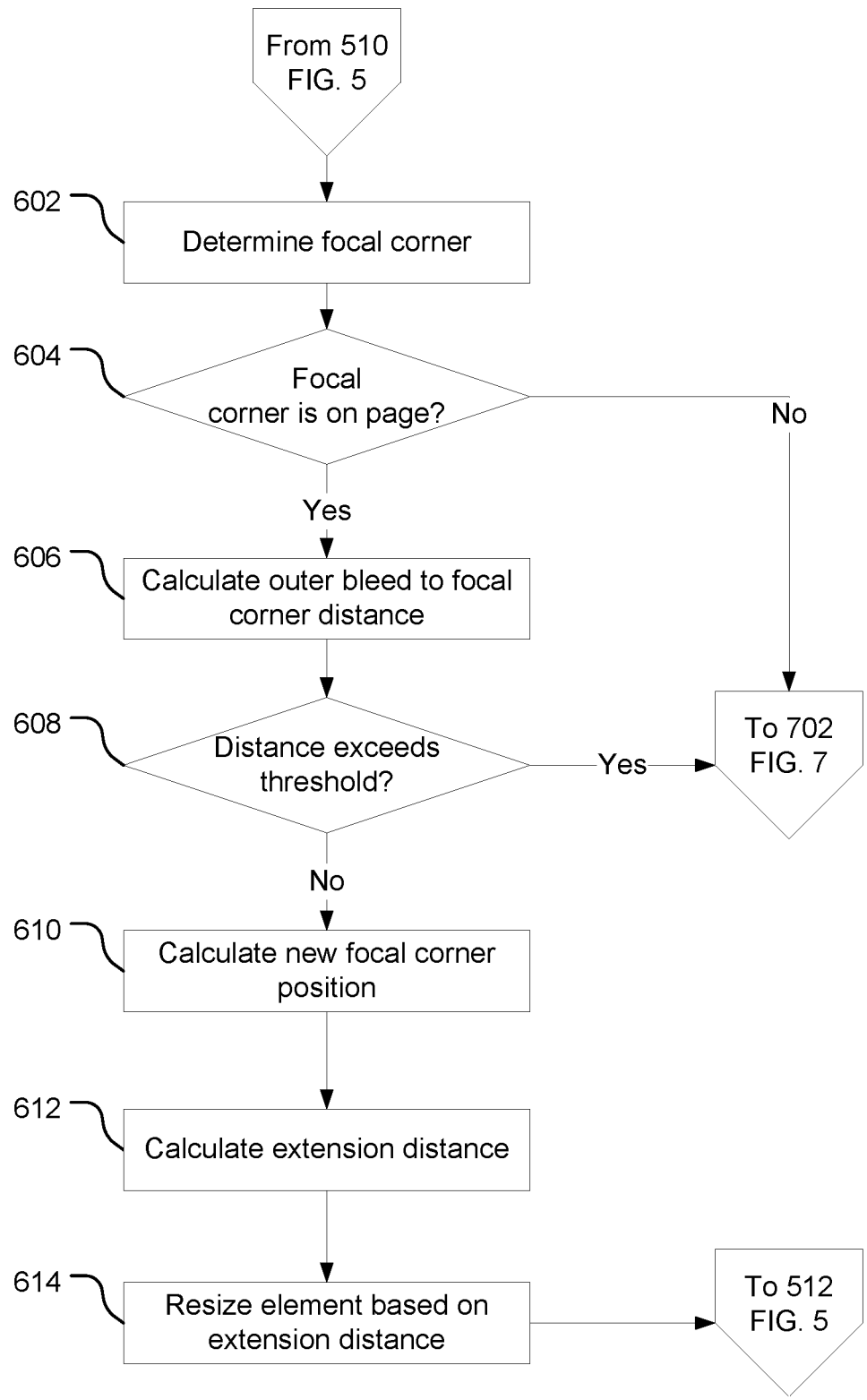
FIG. 6 is a flowchart depicting operations involved in processing a selected edge/bleed pair in accordance with a corner extension method.

Turning to FIG. 6, processing a bounding box edge/bleed pair in accordance with the corner extension method 600 will be described.

In this section, reference to 'the edge' is reference to the bounding box edge selected at 508 and reference to 'the bleed' is reference to the bleed selected at 510 which, as described above, has a corresponding orientation (horizontal or vertical) to that of the edge.

At 602, system 210 determines a focal corner of the edge. The focal corner is the corner of the edge that is inside the page and furthest or equal furthest distance from the bleed (e.g. the outer edge of the bleed).

For vertically oriented edge/bleed pairs the focal corner is the corner whose x coordinate is furthest from the x coordinate of the bleeds outer coordinate. For horizontally oriented edge/bleed pairs the focal corner is the corner whose y coordinate is furthest from the x coordinate of the bleeds outer coordinate.

If the edge is parallel to the bleed (and the corners are equidistant from the bleed) either corner may be selected as the focal corner.

At 604, system 210 determines if the focal corner (determined at 602) is within the page area. With the coordinate system described above, system 210 may determine the focal corner is on the page if the following evaluates true:

(left bleed outer coordinate<=focal corner x coordinate<=right bleed outer coordinate) AND (top bleed outer y coordinate<=focal corner y coordinate<=bottom bleed outer y coordinate)

Figure 8:
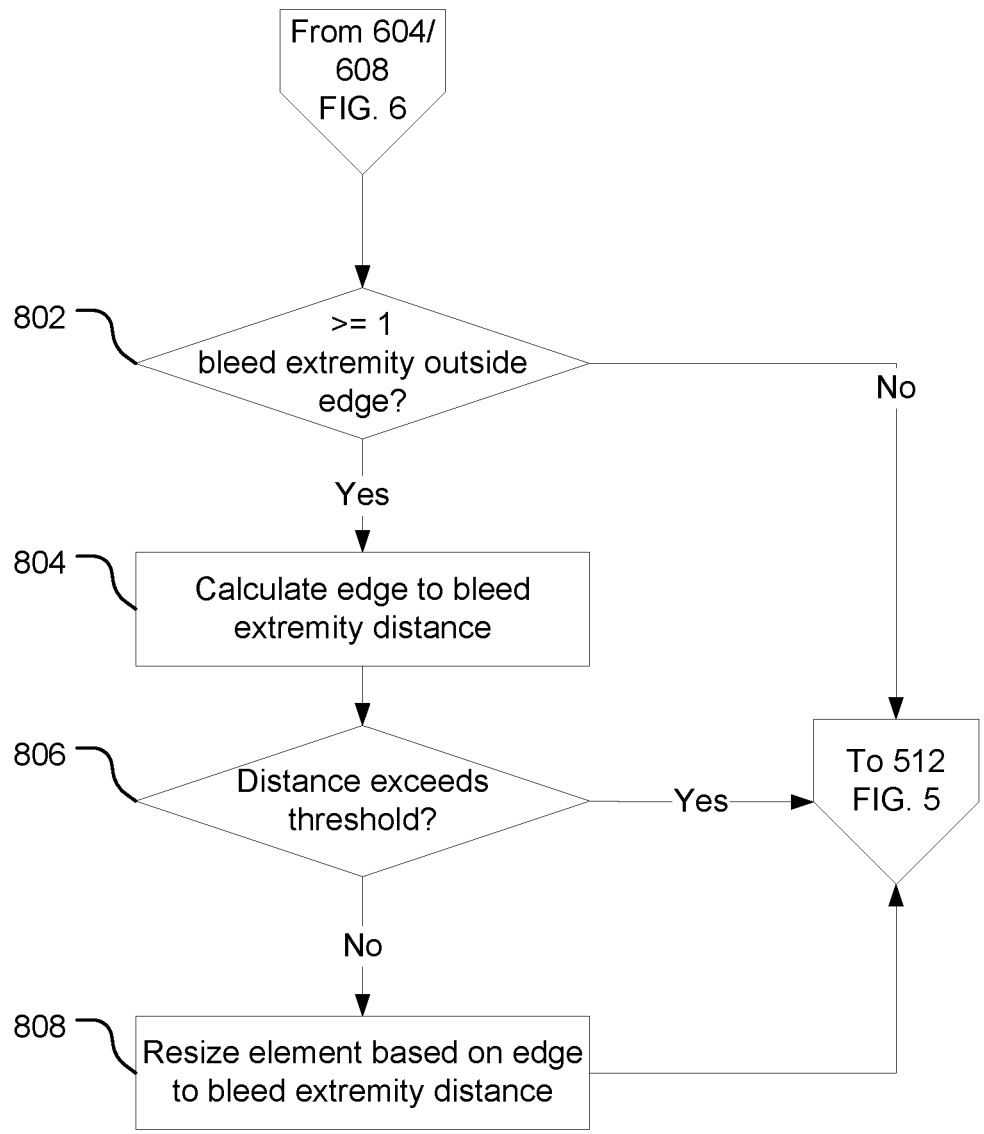
FIG. 8 is a flowchart depicting operations involved in processing a selected edge/bleed pair in accordance with a distance extension method.

If the focal corner is not on the page, system 210 determines that extending the element by the corner method is not suitable and processing proceeds to the extension by distance method at 802 (FIG. 8).

If the focal corner is on the page, processing proceeds to 606.

At 606, system 210 calculates an outer bleed to focal corner distance. The outer bleed to focal corner distance is measured along the transverse axis of the bleed—i.e. the distance along a line that is perpendicular to outer edge of the bleed and joins the outer edge of current bleed area to the focal corner. This may be calculated as follows:

| Bleed | Outer bleed to focal corner distance |
|---|---|
| Left | x coordinate of focal corner—left bleed outer coordinate |
| Right | right bleed outer coordinate—x coordinate of focal corner |
| Top | y coordinate of focal corner—top bleed outer coordinate |
| Bottom | bottom bleed outer coordinate—y coordinate of focal corner |

At 608, system 210 determines if the outer bleed to focal corner distance (calculated at 606) exceeds a defined corner separation threshold distance. In the present example, the corner separation threshold distance is set a twice the bleed width (e.g. 6 mm if the bleed width is 3 mm). Alternative threshold distances may, however, be used.

If the outer bleed to focal corner distance exceeds the defined corner separation threshold distance, system 210 determines that extending the element by the corner method is not suitable and processing proceeds to the extension by distance method at 802 (FIG. 8).

If the outer bleed edge to focal corner distance does not exceed the defined corner separation threshold, processing continues to 610.

At 610, system 210 calculates a new position for the focal corner. In the present example, the new position is a position that extends the focal corner along a line that is perpendicular to the bounding box edge and passes through the focal corner.

The adjacent bounding box edge is the edge of the bounding box that extends from the focal corner and is not the bounding box edge currently being processed. For example:

| Bounding box edge being processed | Focal corner | Adjacent bounding box edge |
|---|---|---|
| Left or right | Top | Top |
| Left or right | Bottom | Bottom |
| Top or bottom | Left | Left |
| Top or bottom | Right | Right |

The new position may be calculated by linear interpolation, for example:

$$y - y_1 = \frac{y_2 - y_1}{x_2 - x_1}(x - x_1)$$

In this equation, (x, y) are the x/y coordinates of the new corner position. Where the left bleed is being processed x=the left bleed outer coordinate and the above equation is solved for y; where the right bleed is being processed x=the right bleed outer coordinate and the above equation is solved for y where the top bleed is being processed y=the top bleed outer coordinate and the above equation is solved for x; where the bottom bleed is being processed x=the bottom bleed outer coordinate and the above equation is solved for y. Final coordinates may be rounded up/down to the nearest integer coordinate that sits outside the bleed.

$(x_1, y_1)$ are the x/y coordinates of the adjacent corner. The adjacent corner is the bounding box corner opposite the focal corner on the adjacent bounding box edge (described above). For example:

| Edge | Furthest corner | Adjacent corner |
|---|---|---|
| Left | Top | Top right |
| Left | Bottom | Bottom right |
| Top | Left | Bottom left |
| Top | Right | Bottom right |
| Right | Top | Top left |
| Right | Bottom | Bottom left |
| Bottom | Left | Top left |
| Bottom | Right | Top right |

$(x_2, y_2)$ are the x/y coordinates of the furthest corner's current position.

At 612, system 210 calculates an extension distance (referred to also referred to as the corner extension method extension distance) based on the new focal corner position. The corner extension method extension distance is the distance towards the bleed outer coordinate that the transverse edges need to be extended. The extension distance (d) can be calculated according to the following equation:

$$d = \sqrt{(x_2 - x_1)^2 + (y_2 - y_1)^2}$$

where $(x_1, y_1)$ are the x/y coordinates of the focal corner $(x_2, y_2)$ are the x/y coordinates of the new corner position (calculated at 610)

At 614, system 210 extends the element based on the corner extension method extension distance calculated at 612.

Where the element in question is rectangular (or flagged as being extendible in a single dimension, for example by an extension axis flag as described above), system 210 extrapolates the element, resizing it so that the focal corner is just beyond the bleed's outer edge. Phrased alternatively, the element's bounding box (and with it the element itself) is resized to the newly computed dimensions about an anchor point. An example of extending an element in this way is described below with reference to FIG. 8.

This extrapolation can be performed in various ways, for example by use of functions provided by an image resizing/scaling library.

Where the element in question is flagged as requiring extension in both dimensions (for example by an extension axis flag as described above, set because the element's aspect ratio should be maintained), system 210 extrapolates the element by applying the same scale factor to the edges of the element's bounding box to uniformly scale the element.

Figure 5:
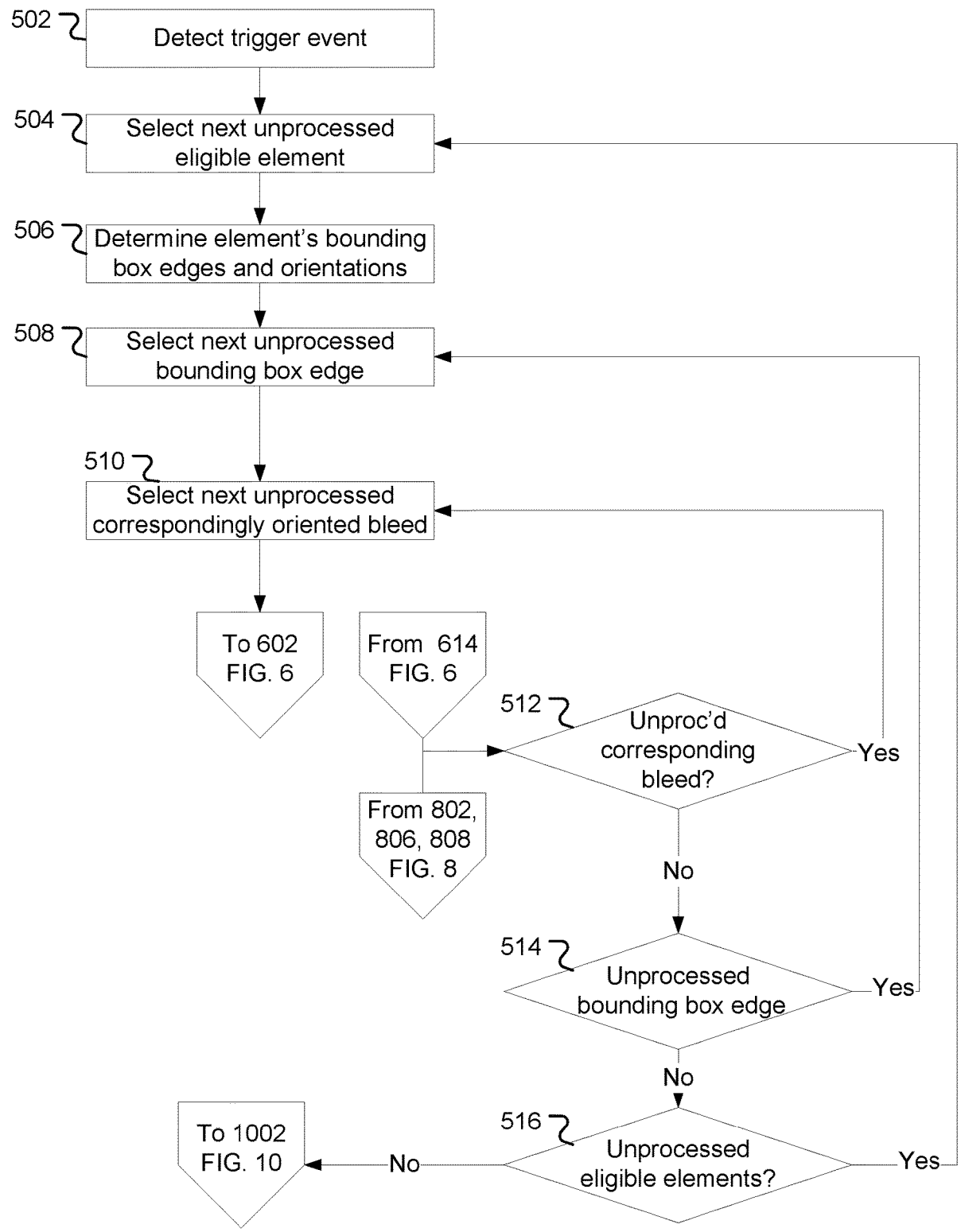
FIG. 5 is a flowchart depicting operations involved in selecting relevant edge/bleed pairs in an automatic print bleed correction process.

If the element is resized at 614 processing proceeds to 512 (FIG. 5). In this case system 210 does not need to process the edge/bleed pair in accordance with the distance extension method.

Corner Extension Method Example

Figure 7:
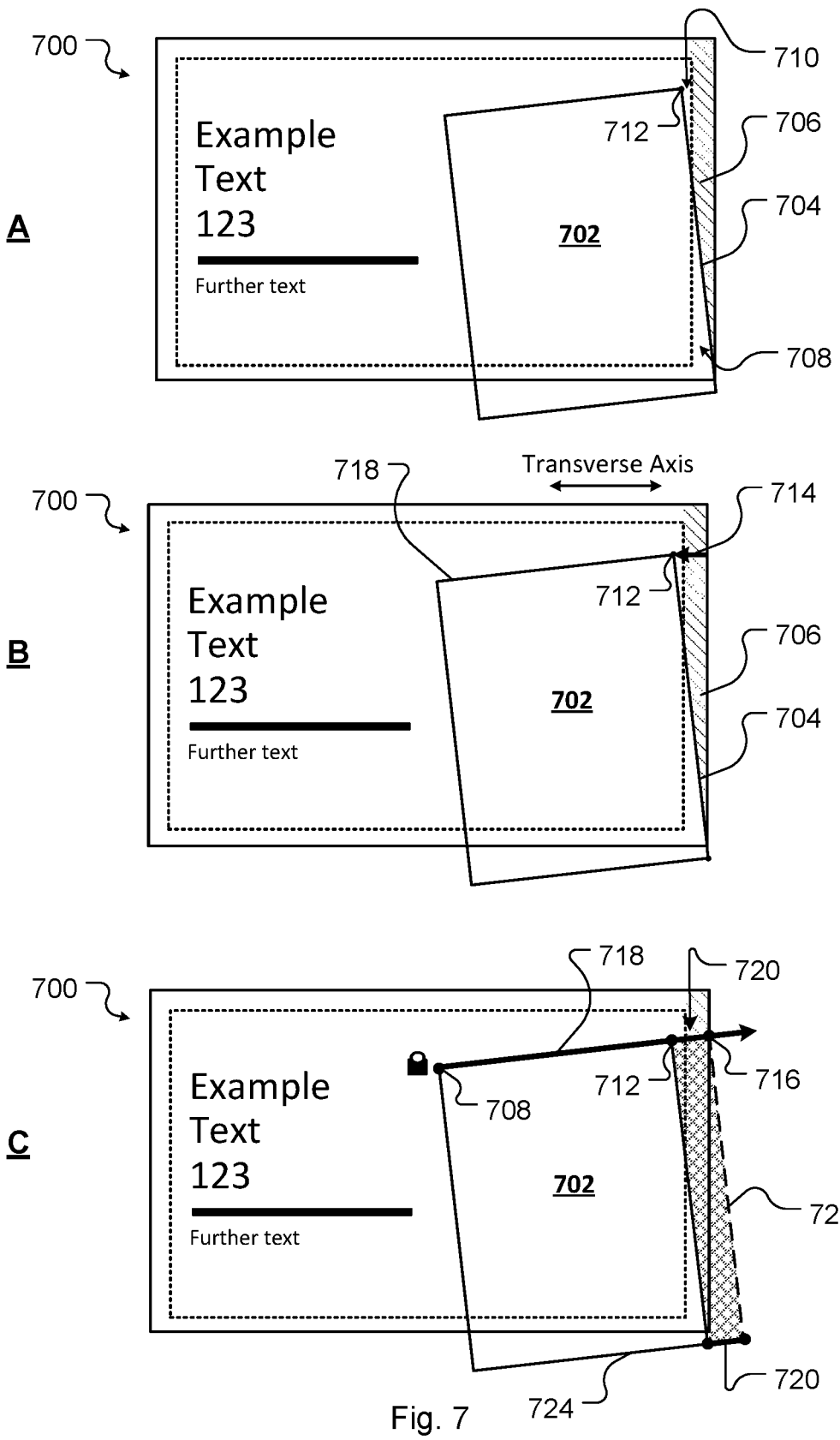
FIG. 7 illustrates features of the corner extension bleed correction process of FIG. 6.

FIG. 7 provides depictions A, B, and C of a page 700 and element 702 processed according to the corner extension method 600 described above.

In the examples provided with respect to FIG. 7: the edge of the edge/bleed pair is the right (vertically oriented) edge 704; the bleed of the edge/bleed pair is the right bleed 706. As can be seen, a portion 708 of element 702 towards the bottom of edge 704 extends into the bleed 706. Towards the top of edge 704, however, the element does not extend into the bleed 706 which creates an unfilled region 710 between the inner edge of the bleed and the element 702.

At 602, system 210 determines the focal corner for the edge/bleed pair to be the top right corner 712, and at 604 that the focal corner is on the page 700.

At 606, system 210 calculates the outer bleed to focal corner distance, indicated by arrow 714 in FIG. 7B. As can be seen, the distance is measured along a line 714 that is horizontal (transverse to the vertically oriented right bleed 706).

At 608, system 210 determines that the outer bleed to focal corner distance is within the corner separation threshold distance.

At 610, system 210 calculates a new focal corner position 716. In this example, the focal corner's transverse edge is the top edge 718 of the bounding box. As can be seen, the new focal corner position 716 lies along a line defined by transverse edge 718 and is just beyond the outer edge of the bleed 704.

At 612, system 210 calculates an extension distance 720, which is the distance between the focal corner's original position 712 and new position 716.

At 614, system 210 resizes the element 702. In this example element 702 is extended into the hatched area 722. This is achieved by extending the transverse edges of the element (or the elements bounding box) 718 and 724 by the extension distance 720 so that the focal corner sits just beyond the bleed's outer edge—i.e. at new position 716.

Distance Extension Method

Turning to FIG. 8, processing a bounding box edge/bleed pair in accordance with the distance extension method will be described.

In this section, reference to 'the edge' is reference to the bounding box edge selected at 508 and reference to 'the bleed' is reference to the bleed selected at 510.

At 802, system 210 determines if at least one of the bleed's extremities is (in this instance) outside the edge (in alternative implementation the determination may be whether at least one of the bleed's extremities is on the edge). With the coordinate system described above, system 210 may determine this by initially calculating a value v for each bleed extremity according to the equation:

$$v = x \cdot (y_1 - y_2) + y \cdot (x_2 - x_1) + (x_1 y_2 - x_2 y_1)$$

Where
(x, y)=x/y coordinates of bleed extremity
$(x_1, y_1)$=x/y coordinates of edge's first (e.g. top or left) corner
$(x_2, y_2)$=x/y coordinates of edge's second (e.g. bottom or right) corner In this example the 'first' corner $(x_1, y_1)$ and 'second' corner $(x_2, y_2)$ are in a clockwise order. For example, for the top edge the corners are, in order, top-left then top-right.

System 210 then determines the sign of the calculated value v for each bleed extremity. A positive value of v for a given bleed extremity indicates that the extremity is inside the edge. Conversely, a negative value of v for a given bleed extremity indicates that the extremity is outside the edge.

If neither bleed extremity is outside the edge, system 210 determines that extending the element by the distance method is not suitable (because the edge would already satisfy the bleed requirements) and processing returns to 512 (FIG. 5). If one or both of the bleed extremities is/are outside (or on depending on implementation) the element's edge, processing proceeds to 806.

At 804, system 210 calculates an edge to bleed extremity distance. The edge to bleed extremity distance is measured along a line that is perpendicular to the edge, and is the distance between the edge and the furthest bleed extremity that is outside the edge. The edge to bleed extremity distance for a given extremity can be calculated using a point-to-line perpendicular distance formula.

Where only one bleed extremity is outside the edge, the edge to bleed extremity distance will be the perpendicular distance between the edge and that bleed extremity. Where both bleed extremities are outside the edge, the edge to bleed extremity distances for both extremities are calculated and the maximum distance used. If the edge is parallel to the bleed both distances will be the same.

At 806, system 210 determines if the edge to bleed extremity distance (calculated at 806) exceeds a defined edge separation threshold distance. In one embodiment, the defined edge separation threshold distance is calculated as 2.5 times the bleed width (e.g. 7.5 mm for a 3 mm bleed). Alternative threshold distances may be used.

If the edge to bleed extremity distance exceeds the edge separation threshold distance, system 210 determines that extending the element by the distance method is not suitable and processing returns to 512 (FIG. 5). If the edge to bleed extremity distance is within the edge separation threshold processing proceeds to 808.

At 808, system 210 resizes the element in question based on the edge to bleed extremity distance calculated at 806 (which may be referred to as the distance extension method extension distance). Resizing the element is the same as operation 614 described above.

Processing then returns to 512 (FIG. 5).

Distance Extension Method Example

Figure 9:
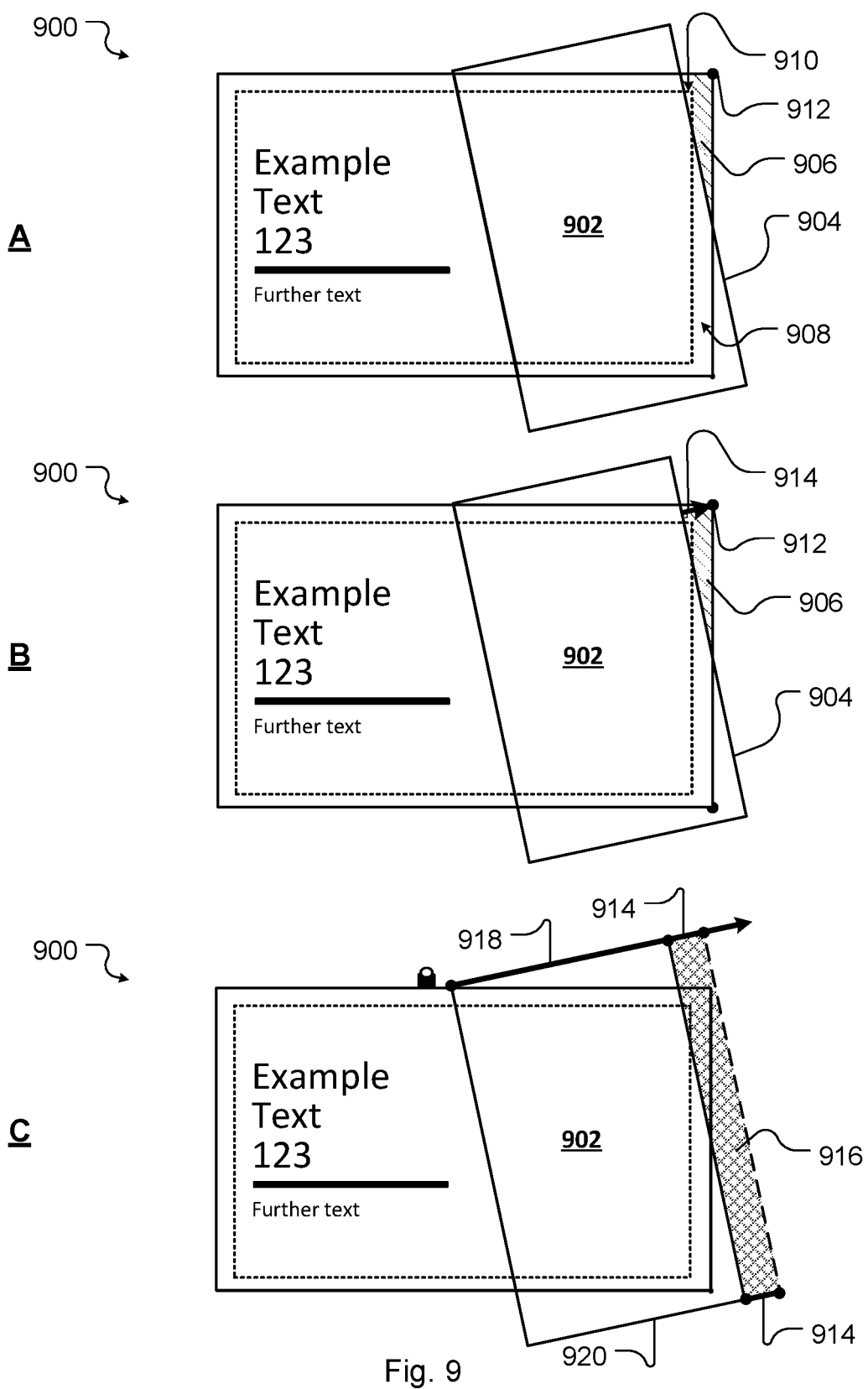
FIG. 9 illustrates features of the distance extension bleed correction process of FIG. 9.

FIG. 9 provides depictions A, B, and C of a page 900 and element 902 processed according to the distance extension method 900 described above.

In the examples provided with respect to FIG. 9: the edge of the edge/bleed pair is the right (vertically oriented) edge 904; the bleed of the edge/bleed pair is the right bleed 906. As can be seen, a portion 908 of element 902 towards the bottom of edge 904 extends into the bleed 906. Towards the top of edge 904, however, the element does not extend into the bleed 906 which creates an unfilled region 910 between the inner edge of the bleed and the element 902.

At 802, system 210 determines that the bleed extremity 912 (top right) is outside edge 904.

At 804, system 210 calculates the edge to bleed extremity distance 914. In this case only one bleed extremity 912 is outside the edge 904.

At 806, system 210 determines that the edge to bleed extremity distance is within the edge separation threshold.

At 808, system 210 resizes the element 902 by the edge to bleed extremity extension distance. In this example element 902 is resized to extend into the hatched area 916. This is achieved by extending the transverse edges of the element (or the elements bounding box) 918 and 920 by the extension distance 914.

Design Page Approval

Figure 10:
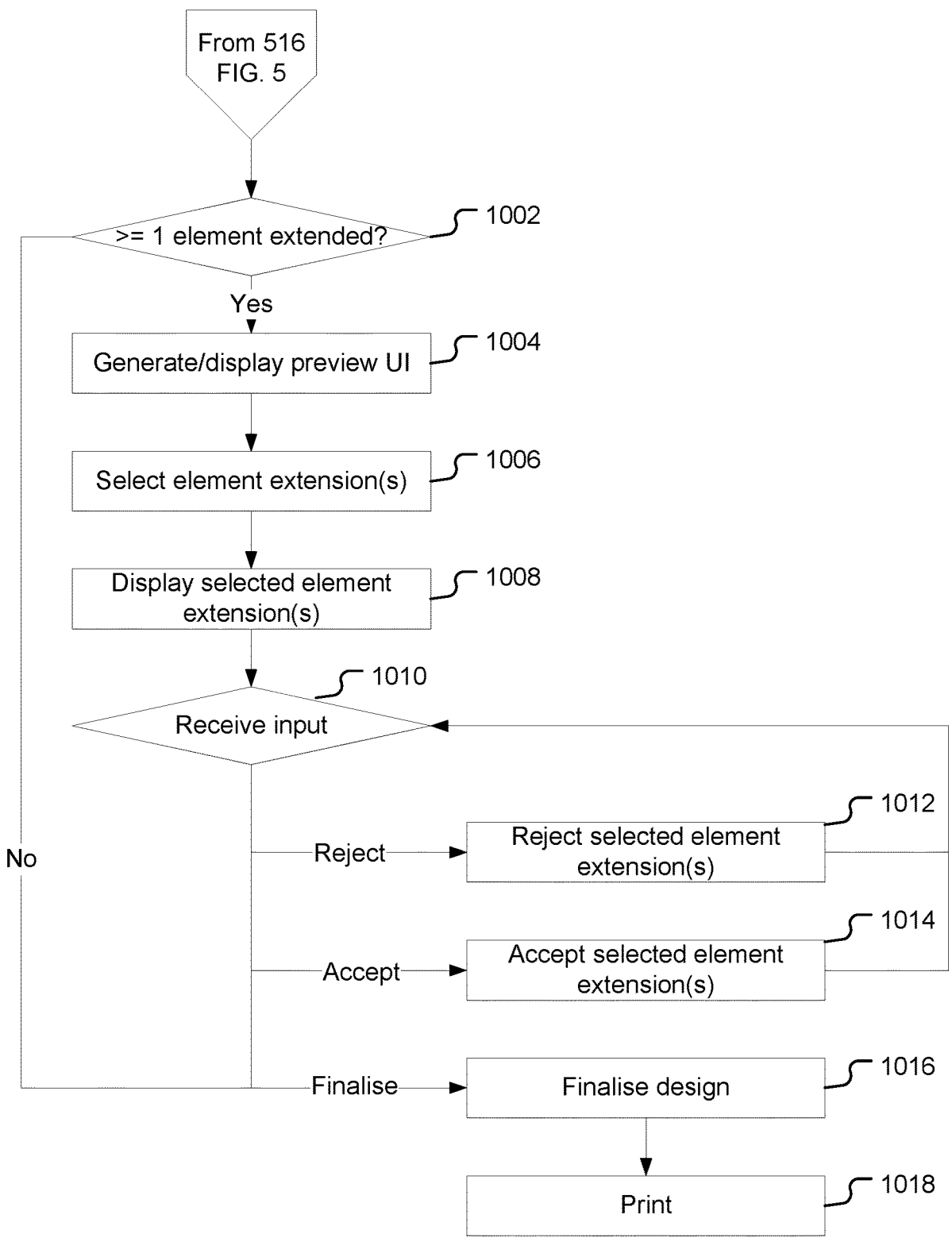
FIG. 10 is a flowchart depicting operations involved in a design page approval process.

In the present embodiment, once all relevant edge/bleed pairs have been processed, system 210 performs a design page approval process 1000 (FIG. 10).

In alternative embodiments no approval process is performed—i.e. element extensions are simply implemented without preview or user input. In this case, and as an example, if the bleed auto correct process was triggered as part of a print operation system 210 would print/send the design page for printing after all eligible elements have been processed and any extensions made (i.e. after 516).

In the present embodiment, however, at 1002 system 210 determines if one or more elements of the page was extended over the course of process 500. If no elements were extended, processing proceeds to 1016 where system 210 finalizes the design. In some implementations a message may be displayed to the user indicating that no bleed corrections were identified.

If one or more elements of the page was extended, processing proceeds to 1004. At 1004, system 210 generates and causes a design page approval user interface to be displayed. One example of such an interface is described below with reference to FIG. 11.

Generally speaking, the preview UI displays the element extension(s) that have been calculated/performed and allows the user to accept or reject the extension(s).

At 1006, system 210 selects one or more of the element extensions that have been made. Selection may be automatic and/or in response to a user input.

For example, on initially displaying the preview UI system 210 may be configured to automatically select: all element extensions that have been made; all extension that have been made to a single element (e.g. the rearmost element that has had at least one extension); a single extension that has been made to a single element; or an alternative extension/plurality of extensions.

System 210 may also (or alternatively) be configured to select one or more element extensions in response to user input. Generally speaking, such user inputs may include user inputs to select: all extensions; all extensions of one or more particular elements; one or more extensions of one or more particular elements; all extensions relevant to one or more particular bleeds.

By way of example, system 210 may be configured to select one or more element extensions in response to user inputs such as: direct element selection (e.g. a click or touchscreen contact at the position the element is displayed), causing all extensions associated with the selected element to be selected; direct element extension selection (e.g. a click or touchscreen contact at the position a particular element extension is displayed), causing the particular extension to be selected; activation of an all extensions control, causing all extended elements (and all extensions thereof) to be selected; activation of a next or previous extended element control, causing all extension of a next or previous element to be selected (next and previous being determined in any appropriate order, for example element depth order); activation of a next or previous element extension control, causing a next or previous extension of a particular element to be selected (next and previous extensions being determined in any appropriate order, only applicable if the particular element has multiple extensions); activation of a select all extensions with respect to [top or bottom or left or right] bleed control, causing selection of all element extensions made with respect to the particular bleed; and/or other user inputs.

At 1008, system 210 displays the element extension(s) selected at 1006.

System 210 visually distinguishes a selected element extension (or group of extensions) from the original element(s). This may be performed in various ways. For example, system 210 may display an animation (or repeating animation) of the original element(s) being extended. Alternatively, system 210 may display the extended area(s) (or outline(s) thereof) of the element(s) in a way that is visually distinguished from the original/unextended area(s) of the element(s), for example by use of colour(s), transparency, edge line weight(s)/colour(s)/styles or any other visual differences. As yet a further example, a user may be provided with 'before' and 'after' controls—activating the 'before' control causing system 210 to display the original, unextended element(s) that have been selected and activation of the 'after' control causing system 210 to display the element extension(s) that have been selected. Alternative mechanisms for visually distinguishing original elements and element extensions may be used.

At 1010, system 210 receives user input and determines the input type. For present purposes relevant user inputs are: a reject input (via, for example, a 'reject extension(s)' control), in which case processing proceeds to 1012; an accept input (via, for example, an 'accept extension(s)' control), in which case processing proceeds to 1014; a finalise design page input, in which case processing proceeds to 1016.

At 1012, system 210 rejects the selected element extension(s)—e.g. by flagging the extension(s) as extension(s) that is/are not to be included in the final design. Processing then returns to 1010 to await further input.

At 1014, system 210 accepts the selected element extension(s)—e.g. by flagging the extension(s) as extension(s) that is/are to be included in the final design. System 210 may also display any extensions that have been accepted as if they were part of the original design in the preview UI.

At 1016, system 210 finalizes the design by incorporating all element extensions that have been accepted and discarding all element extensions that have been rejected. Processing then returns to 1018 to await further input.

At 1018 the design page has been finalised. In this particular example system 210 prints the design page (or causes the design page to be printed) at 1018. Alternative operations are, however, possible depending on context. For example, system 210 may instead (or additionally): save the design page; share the design page; publish the design page; and/or perform other operations with respect to the finalised design page.

Where a design has multiple pages, system 210 may repeat process 500 (and/or design page approval process 1000) for each page of the design.

As one example of design page approval process 1000, system 102 may: determine element extensions have been made (at 1002); display the preview UI (at 1004) with all extensions automatically selected (at 1006) and displayed (at 1008); receive a finalise design input (at 1010); finalise the design by incorporating all extensions (at 1016); and print the finalised design (at 1018).

Example Design Page Approval User Interface

Figure 11:
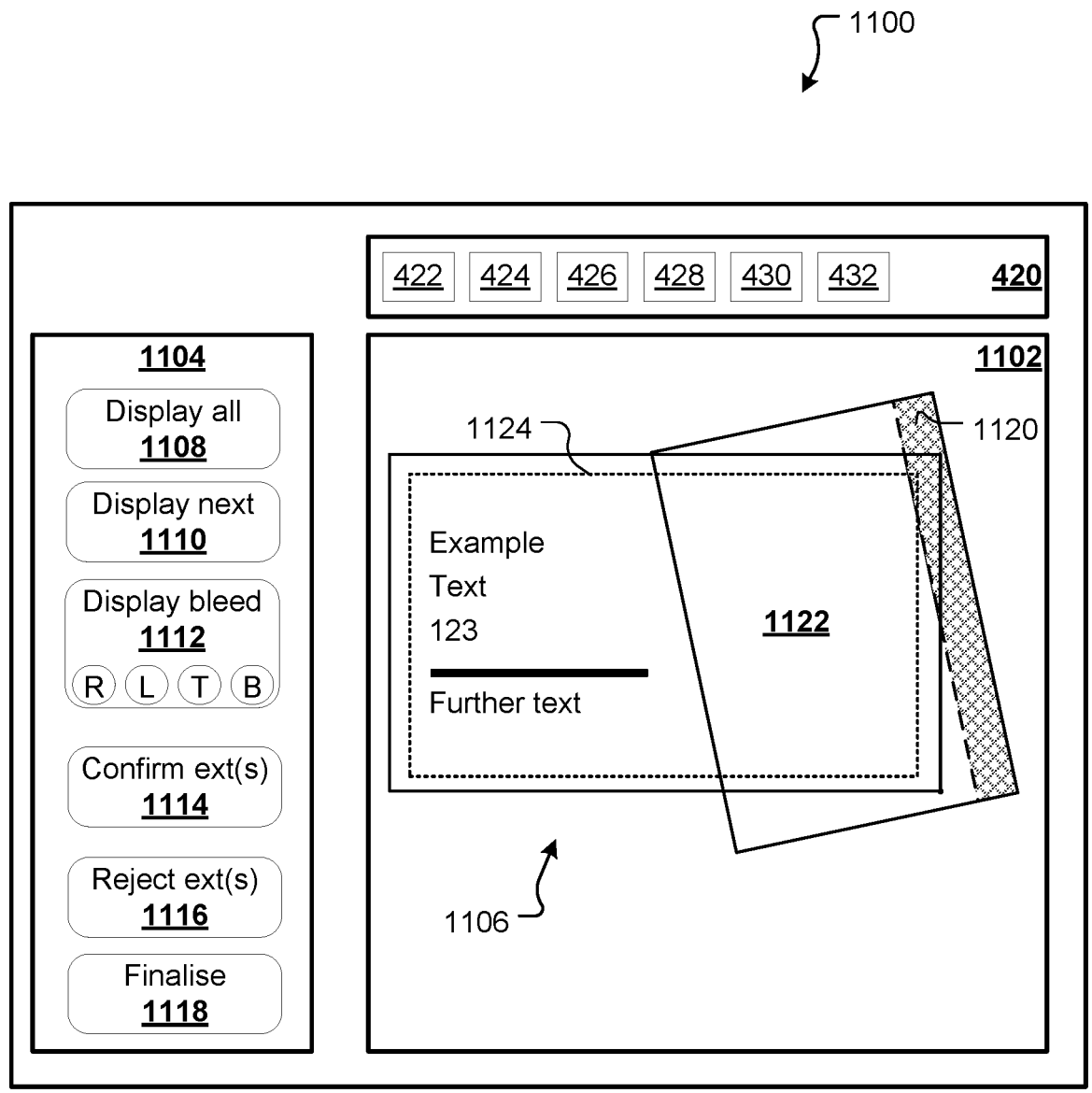
FIG. 11 depicts a design approval user interface.

FIG. 11 provides an example design page approval UI 1100.

In this particular example, preview UI 110 is similar to design creation interface 400 described above, with the exception that a design preview pane 1104 is displayed instead of the design creation pane 402 and a preview control pane 1106 is displayed instead of the design element search and selection pane 410.

Design preview pane 1104 is used to display the design page 1106 being previewed.

Preview control pane 1104 provides user interface controls for the page approval process. In this example, the UI controls include: a display all control 1108 (activation of which causes all extensions to all elements to be selected and displayed in the preview pane 1104); a display next element control 1110 (activation of which causes all extensions of a next element to be selected and displayed in the preview pane 1104); display bleed controls 1112R, 1112L, 1112T, 1112B (activation of which causes all extensions relevant to the selected bleed to be displayed); a confirm extension(s) control 1114 (activation of which causes the selected/displayed extensions(s) to be confirmed); a reject extension(s) control 1116 (activation of which causes the selected/displayed extensions(s) to be rejected); and a finalise design control 1118 (activation of which causes the design to be finalised). Additional/fewer/alternative controls may be provided.

In the example of FIG. 11, a single extension (extension 1120 to element 1122) has been selected and is displayed. In this example, the extension 1120 is visually distinguished from the original element by a colour overlay effect (e.g. a red or other colour overlay), indicated by hatching in this instance. In addition, the preview pane 114 displays the inner bleed edges (via the broken outline box 1124) so the user can determine where these are and how the final trimmed page will appear.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless required by context, the terms "first", "second", etc. are used to differentiate between various elements and features and not in an ordinal sense. For example, a first edge bleed pair could be termed a second edge bleed pair, and, similarly, a second edge bleed pair could be termed a first edge bleed pair, without departing from the scope of the various described examples.

Unless otherwise stated, the terms "include" and "comprise" (and variations thereof such as "including", "includes", "comprising", "comprises", "comprised" and the like) are used inclusively and do not exclude further features, components, integers, steps, or elements.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

The invention claimed is:

1. A computer implemented method comprising:
   selecting, by a processing unit, an element on a design page;
   determining, by the processing unit, whether the element should be resized, the determination being based on a position of a particular edge associated with the element relative to a particular bleed defined for the design page; and
   in response to determining that the element should be resized, resizing the element so that the element covers a larger portion of the design page than was originally covered by the element.

2. The computer implemented method of claim 1, wherein resizing the element comprises resizing the element so that the element covers a larger portion of the particular bleed than was originally covered by the element.

3. The computer implemented method of claim 1, wherein determining that the element should be resized comprises determining that:
   a focal corner of the particular edge of the element is within a page area of the page; and
   a distance between the focal corner and an outer edge of the particular bleed is within a corner separation threshold distance.

4. The computer implemented method of claim 3, wherein resizing the element comprises resizing the element so that the focal corner is on or outside the outer edge of the particular bleed.

5. The computer implemented method of claim 3, wherein the focal corner is a corner of the particular edge that is within the page area and that is a corner of the particular edge that is the furthest or equal furthest distance from the outer edge of the particular bleed.

6. The computer implemented method of claim 1, wherein determining whether the selected element should be resized comprises determining that:
   an extremity of the particular bleed is on or outside the particular edge; and
   a distance between the particular edge and the extremity of the particular bleed is within a threshold distance.

7. The computer implemented method of claim 6, wherein the distance between the particular edge and the extremity of the particular bleed is calculated as the distance between the particular edge and the extremity of the particular bleed is measured along a line that is perpendicular to the particular edge.

8. The computer implemented method of claim 6, wherein resizing the element comprises resizing the element so the particular edge is on or outside an outer edge of the particular bleed.

9. The computer implemented method of claim 1, wherein the particular edge associated with the element is an edge of a rectangular bounding box that bounds the element.

10. The computer implemented method of claim 1, wherein an orientation of the particular edge and an orientation of the particular bleed are corresponding.

11. A computer processing system comprising:
a processing unit;
a communication interface; and
a non-transitory computer-readable storage medium storing instructions, which when executed by the processing unit, cause the processing unit to perform a method comprising:
selecting an element on a design page;
determining whether the element should be resized, the determination being based on a position of a particular edge associated with the element relative to a particular bleed defined for the design page; and
in response to determining that the element should be resized, resizing the element so that the element covers a larger portion of the design page than was originally covered by the element.

12. The computer processing system of claim 11, wherein resizing the element comprises resizing the element so that the element covers a larger portion of the particular bleed than was originally covered by the element.

13. The computer processing system of claim 11, wherein determining that the element should be resized comprises determining that:
a focal corner of the particular edge of the element is within a page area of the page; and
a distance between the focal corner and an outer edge of the particular bleed is within a corner separation threshold distance.

14. The computer processing system of claim 13, wherein resizing the element comprises resizing the element so that the focal corner is on or outside the outer edge of the particular bleed.

15. The computer processing system of claim 13, wherein the focal corner is a corner of the particular edge that is within the page area and that is a corner of the particular edge that is the furthest or equal furthest distance from the outer edge of the particular bleed.

16. The computer processing system of claim 11, wherein determining whether the selected element should be resized comprises determining that:
an extremity of the particular bleed is on or outside the particular edge; and
a distance between the particular edge and the extremity of the particular bleed is within a threshold distance.

17. The computer processing system of claim 16, wherein the distance between the particular edge and the extremity of the particular bleed is calculated as the distance between the particular edge and the extremity of the particular bleed is measured along a line that is perpendicular to the particular edge.

18. The computer processing system of claim 16, wherein resizing the element comprises resizing the element so the particular edge is on or outside an outer edge of the particular bleed.

19. The computer processing system of claim 11, wherein the particular edge associated with the element is an edge of a rectangular bounding box that bounds the element.

20. The computer processing system of claim 11, wherein an orientation of the particular edge and an orientation of the particular bleed are corresponding.

* * * * *